United States Patent [19]

Childs

[11] Patent Number: 4,737,271

[45] Date of Patent: Apr. 12, 1988

[54] HYDROCYCLONE SEPARATION OF DIFFERENT-SIZED PARTICLES

[75] Inventor: Geoffrey J. Childs, Truro, United Kingdom

[73] Assignee: Richard Mozley Limited, Redruth, United Kingdom

[21] Appl. No.: 41,240

[22] Filed: Apr. 22, 1987

[30] Foreign Application Priority Data

Apr. 24, 1986 [GB] United Kingdom ................. 8610009

[51] Int. Cl.[4] ......................... B01D 43/00; B04C 5/04

[52] U.S. Cl. .................................... 209/144; 209/211; 210/788; 210/512.1

[58] Field of Search ............................... 209/211, 144; 210/512.1, 304, 787, 788; 55/459 A-459 E

[56] References Cited

U.S. PATENT DOCUMENTS 2,756,878 7/1956 Herkenhoff ......................... 209/211
2,793,748 5/1957 Herkenhoff ......................... 209/211
3,331,193 7/1967 Woodruff ............................ 209/211
4,203,834 5/1980 Martin ................................ 209/211
4,226,708 10/1980 McCartney ......................... 209/211
4,235,363 11/1980 Liller .................................. 209/211

FOREIGN PATENT DOCUMENTS 637962 5/1950 United Kingdom ................ 209/211

*Primary Examiner*—Benoit Castel
*Attorney, Agent, or Firm*—Thomas J. Greer, Jr.

[57] ABSTRACT

A hydrocyclone comprising a vertical-axis separating chamber having an upper cylindrical portion and a lower, coaxial conically-tapering portion has: a tangential inlet at its upper end for a suspension to be classified; an upper, axial outlet for the overflow containing finer particles separated in the hydrocyclone in use; a lower axial outlet for the underflow containing coarser particles; and a hollow spigot surrounding the upper outlet and projecting into the separating chamber. The separation of coarse particles from the overflow is improved by the provision of an extension tube extending coaxially from the spigot into the separating chamber.

5 Claims, 1 Drawing Sheet

HYDROCYCLONE SEPARATION OF DIFFERENT-SIZED PARTICLES

BACKGROUND OF THE INVENTION

The present invention relates to a hydrocyclone for mineral separation.

The invention is particularly concerned with the separation of different-sized particles of the same or similar densities i.e., similar specific gravities, and has been developed with a view to improving the separation of china clay.

In the china clay industry, the kaolin particles washed out of the kaolinized matrix are separated into different grades of material for different uses according to particle size, the very finest clay being used, for example, in the paper industry. This separation is carried out in various stages in settling tanks, centrifuges and/or hydrocyclones.

The final separation stage, giving fine kaolin with an extremely low residual content of coarser particles, is usually carried out in settling tanks, comprising enormous concrete structures which are extremely expensive to build and maintain, and the object of the present invention is to provide an improved hydrocyclone separator which is able to achieve comparable results at reduced costs.

As is known, a hydrocyclone comprises a hollow body defining a separating chamber having a cylindrical portion opening into a coaxial frusto-conical portion which tapers to a first axial outlet, the body also having a tangential inlet to the cylindrical chamber portion adjacent an end wall thereof and a hollow spigot projecting coaxially from the end wall into the separating chamber to define a second axial outlet from the chamber, the spigot having an axial extent slightly greater than that of the inlet.

In use, the hydrocyclone is arranged with its axis vertical and the inlet at its upper end. A suspension containing particles of different sizes is fed in through the inlet and enters the chamber around the hollow spigot, termed a vortex finder. By virtue of the configuration of the inlet and of the hydrocyclone generally, the suspension is forced to rotate downwardly and inwardly as the chamber tapers, creating a primary vortex flow adjacent the hydrocyclone wall. Centrifugal forces acting on the particles in the suspension cause larger, heavier particles to be entrained with this primary vortex flow which exits through the lower outlet as the underflow while lighter particles are entrained in a secondary, upwardly-moving vortex flow created in the central part of the hydrocyclone and exit with the flow (overflow) through the second, or upper, outlet. The separation achieved is not, however, complete: a certain proportion of larger particles is entrained with the lighter one and vice versa and a cut point, $d_{50}$, is defined for any one hydrocyclone, this being the size of particle which stands an equal chance of exiting with the overflow or the underflow.

The $d_{50}$ value for a given hydrocyclone is governed by many factors, the most important of which are the vortex-finder diameter, the feed pulp (suspension) density and the inlet pressure: in general the $d_{50}$ value is reduced as the vortex-finder diameter and the pulp density are reduced and the inlet pressure is increased, but reductions in the first two factors also result in reductions in throughput. With a knowledge of these and other factors, hydrocyclones can be designed with appropriate $d_{50}$ values for different uses, even down to the fine cut point needed to provide an overflow suitable for paper making, but it has not until now been possible to reduce the proportion of larger particles in the overflow to a desirable extent with commercially-viable flows. It is thus the object of the present invention to improve the performance of hydrocyclones and this has been found to be possible by a most unexpected modification.

SUMMARY OF THE INVENTION

Accordingly, the present invention provides a hydrocyclone of the type described above, characterised in that the hydrocyclone includes an extension tube projecting coaxially into the separating chamber from the free end of the spigot constituting the vortex finder.

It will be appreciated that, in known hydrocyclones, the heavier particles in the suspension tend to be flung against the outer wall of the chamber and flow downwardly along and around the wall to the lower outlet while the overflow, which contains the finer particles, is drawn through the vortex finder from the upper, wider part of the hydrocyclone chamber. In the hydrocyclone of the invention, the overflow is drawn through the vortex-finder extension, from a point lower down within the body of the hydrocyclone, that is, from a point closer to the flow containing the heavier, underflow particles, and would be expected to contain a larger proportion of these particles than in an overflow obtained from a similar hydrocyclone without the extension. Extension tubes in accordance with the invention, however, produce the opposite result, that is, give better separation of the coarser particles.

The degree of improvement in the removal of the coarser particles from the overflow can be adjusted by changing the dimensions of the extension tube for a given hydrocyclone, the separation improving with increases in the length of the extension tube up to a certain limit. It is found that a combined length of the extension tube and the vortex finder of the order of twice the internal diameter of the cylindrical chamber of the hydrocyclone provides particularly good results.

The extension tube itself should be thin-walled so as not to disturb the flows within the hydrocyclone to too great an extent but the forces acting on the extension tube in use are considerable so that a strong material, such as, stainless steel, is preferred. If the hydrocyclone body is itself of steel then the extension tube may be integral with the vortex finder but, in the usual plastics hydrocyclones, secure fixing of a steel tube to the vortex finder must be achieved. For this purpose the steel tube may be made to extend through the vortex finder being secured by gluing, the engagement of mutually cooperating points or by other suitable means. The duct may be be enlarged to contain a tube having the same internal dimensions as the original duct so as to maintain the general flow characteristics of the hydrocyclone.

Other metals or materials, such as ceramics, may alternatively be suitablle for the extension tube.

BRIEF DESCRIPTION OF THE DRAWING

One embodiment of the invention will now be more particularly described, by way of example, with reference to the accompanying schematic drawing which is a longitudinal-sectional view through a hydrocyclone.

DETAILED DESCRIPTION OF THE PREFERRED EMBODIMENT

Figure 1:
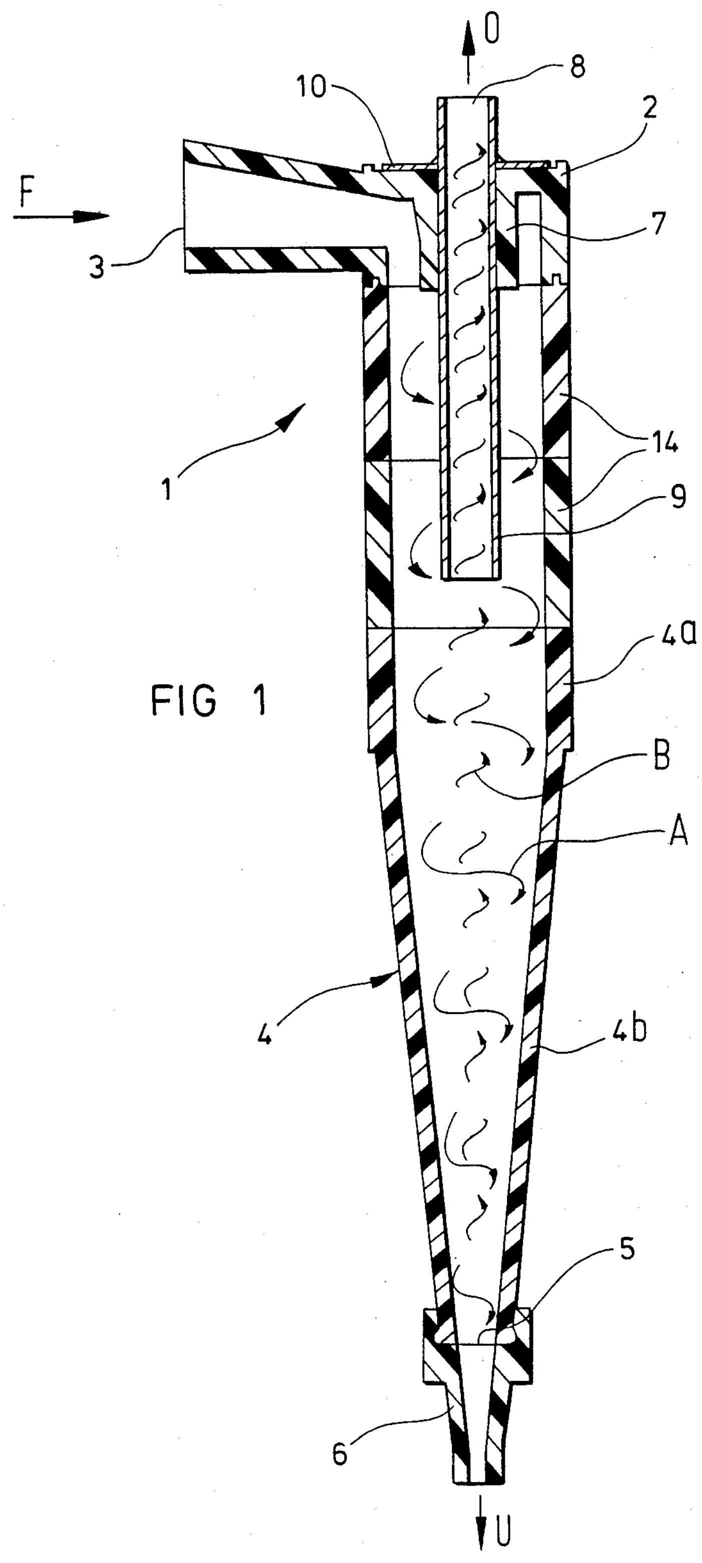

With reference to the drawing, a hydrocyclone, generally indicated 1, is shown in its vertical orientation of use and comprises two main, hollow body parts: an upper, generally-cylindrical part 2 with a tangential inlet 3 and a lower part 4 with an upper cylindrical portion 4*a* and a lower frusto-conical portion 4*b* which tapers to an axial bottom outlet 5. The two parts 2, 4 are shown separated by two optional, hollow, cylindrical, body extensions 14 having the same internal and external diameters as the part 2 and the cylindrical portion 4*a*.

All the parts 2, 4 and 14 may be injection or pour moulded from polyurethane and are screw-clamped together in known manner by clamps, not shown. A coaxial outlet spigot 6 is attached to the bottom end of the lower part 4.

The upper part 2 of the hydrocyclone 1 also has an integral, hollow, axially-extending spigot 7, normally termed a vortex-finder, projecting downwardly into the upper cylindrical part 2 of the separating chamber to terminate slightly below the lower edge of the inlet 3. Fixed within, and extending through, the vortex-finder 7 is a steel tube 9 which has a lower portion extending into the separating chamber of the hydrocyclone 1 and, in the embodiment shown, an upper portion projecting upwardly from the hydrocyclone and defining an upper, axial outlet 8.

In order for comparative tests to be carried out with hydrocyclones 1, with and without extension tubes 9, it was important for the outlet 8 to have the same diameter for all the tests. To this end, the outlet bore of the hydrocyclone was enlarged to take the steel extension tube 9 which had the same internal diameter as the original outlet bore, and an upper portion (not shown) of the spigot 7 which normally projects upwardly from the top of the chamber part 2 to define the upper axial outlet was removed.

In initial tests, the tube 9 was simply a press fit in the outlet bore or had its upper end upset to fix it in position more securely. Subsequently, however, an annular reinforcing plate, indicated 10 in the drawing, was welded to it at right angles to the axis of the tube to provide a projecting annular flange which, in use, is clamped to the top of the body part 2 of the hydrocyclone by a top plate not shown.

In use of the hydrocyclone 1, a suspension of kaolin in water is pumped in through the inlet 3 in the direction of the arrow F and is forced, by the configuration of the inlet 3 and the chamber walls, to rotate within the hydrocyclone, creating a primary, downwardly-moving vortex, indicated by the arrow A, adjacent the chamber wall: this part of the flow exits through the lower outlet 5 as the underflow, indicated by the arrow U. A secondary vortex is also created in the centre of the chamber, with an upward flow indicated B, which exits through the upper outlet 8 as the overflow, indicated by the arrow O. The larger heavier particles in the suspension, being more affected by centrifugal force than the smaller, lighter particles, tend to be flung towards the chamber wall and descend with the flow to the lower outlet 5 while lighter particles are entrained with the flow to the upper outlet 8 so that separation is achieved.

The actual degree of separation depends on various factors including the length of the vortex-finder extension tube 9 and the presence or absence of the body extensions 14.

The results of experiments with two different hydrocyclones and various extension tubes will now be given.

EXAMPLE 1

44 mm hydrocyclone

Tests were carried out with a MOZLEY TYPE C124 Std., 44 mm hydrocyclone with no body extensions 14. Extension tubes 9 of different lengths were used and a test was also carried out with a similar hydrocyclone but with no extension tube, for comprison. The following conditions applied to all the tests:

Feed: China clay overflow suspension from the 125 mm hydrocyclone separation stage of the ECLP workings, St. Austell.

| | |
|---|---|
| Feed pressure: | 344.75 kPa |
| Internal diameter of underflow outlet 5: | 8 mm |
| Internal diameter of overflow outlet 8: | 11 mm |
| Dimensions of rectangular inlet 3: | 9 mm × 6 mm |
| Internal diameter of cylindrical chamber; | 44 mm |
| Length of lower part 4 and spigot 6: | 340 mm |
| Conical taper of lower part 4: | 10° |
| Length of vortex finder 7 within the hydrocyclone chamber | 27 mm |

The following results were obtained.

Test 1.—No extension tube 9

| | Overflow | Underflow | Feed |
|---|---|---|---|
| Pulp Weight (g) (solids + $H_2O$) | 1557 | 1248 | 2805 |
| Dry Solids | 179 | 273 | 452 |
| Pulp % Solids w/w | 11.5 | 21.9 | 16.1 |
| % Weight split | 39.6 | 60.4 | 100 |
| Volume (cc) | 1452 | 1080 | 2532 |
| % Volume Split | 57.4 | 42.6 | 100 |
| Wt. of particles of size > 53μ | 0.0426 | | |
| % Wt. of particles of size > 53μ | 0.0238 | | |
| Ratio of length of vortex finder to internal diameter of cylindrical chamber | 0.61:1 | | |

Test 2—With 15 mm-long extension tube

| | Overflow | Underflow | Feed |
|---|---|---|---|
| Pulp Weight (g) (solids + $H_2O$) | 1720 | 1041 | 2761 |
| Dry Solids | 199 | 293 | 492 |
| Pulp % Solids w/w | 11.6 | 28.1 | 17.8 |
| % Weight Split | 40.4 | 59.6 | 100 |
| Volume (cc) | 1593 | 862 | 2455 |
| % Volume Split | 64.9 | 35.1 | 100 |
| Wt. of particles of size > 53μ | 0.0324 | 2.3156 | |
| % Wt. of particles of size > 53μ | 0.0163 | 0.7895 | 0.4771 |
| Ratio (R) of length of vortex finder and extension tube to internal diameter of cylindrical chamber | 0.95:1 | | |

Test 3—With 45 mm-long extension tube

| | Overflow | Underflow | Feed |
|---|---|---|---|
| Pulp Weight (g) (solids + $H_2O$) | 1428 | 947 | 2375 |
| Dry Solids | 162 | 263 | 425 |
| Pulp % Solids w/w | 11.3 | 27.8 | 17.9 |
| % Weight Split | 38.1 | 61.9 | 100 |
| Volume (cc) | 1332 | 784 | 2116 |
| % Volume Split | 62.9 | 37.1 | 100 |

-continued

| | Overflow | Underflow | Feed |
|---|---|---|---|
| Wt. of particles of size > 53μ | 0.0174 | 2.1100 | |
| % Wt. of particles of size > 53μ | 0.0107 | 0.8019 | 0.5005 |
| Ratio (R) of length of vortex finder and extension tube to internal diameter of cylindrical chamber | 1.64:1 | | |

Test 4—With 75 mm long extension tube

| | Overflow | Underflow | Feed |
|---|---|---|---|
| Pulp Weight (g) (solids + $H_2O$) | 1596 | 890 | 2486 |
| Dry Solids | 181 | 225 | 406 |
| Pulp % Solids w/w | 11.3 | 25.3 | 16.3 |
| % Weight Split | 44.6 | 55.4 | 100 |
| Volume (cc) | 1489 | 753 | 2242 |
| % Volume Split | 66.4 | 33.6 | 100 |
| Wt. of particles of size > 53μ | 0.0104 | 1.5313 | |
| % Wt. of particles of size > 53μ | 0.0057 | 0.6820 | 0.3804 |
| Ratio (R) of length of vortex finder and extension tube to internal diameter of cylindrical chamber | 2.32:1 | | |

EXAMPLE 2

125 mm hydrocyclone

Tests were carried out with a MOZLEY Type C516, 125 mm hydrocyclone fitted with two body extensions 14 with and without extension tubes 9. The following conditions applied to all the tests:

Feed: China clay feed suspension to the 125 mm hydrocyclone separation stage of the ECLP workings, St. Austell.

| | |
|---|---|
| Feed pressure: | 206.85 kPa |
| Internal diameter of underflow outlet 5: | 15 mm |
| Internal diameter of overflow outlet 8: | 40 mm |
| Dimension of rectangular inlet 3: | 27.5 × 23 mm |
| Internal diameter of cylinder chamber: | 125 mm |
| Combined length of the body extensions 14: | 300 mm |
| Conical taper of lower part: | 10° |
| Length of vortex finder 7 within the hydrocyclone chamber | 65 mm |

The following results were obtained.

Test 1—No extension tube

| | Overflow | Underflow | Feed |
|---|---|---|---|
| Pulp Weight (g) (solids + $H_2O$) | 9832 | 333 | 10165 |
| Dry Solids | 1622 | 162 | 1784 |
| Pulp % Solids w/w | 16.5 | 48.7 | 17.6 |
| % Weight Split | 90.9 | 9.1 | 100 |
| Volume (cc) | 8866 | 233 | 9099 |
| % Volume Split | 97.4 | 2.6 | 100 |
| % Wt. of particles of size > 53μ | 0.99 | 24.79 | |
| Ratio (R) of length of vortex finder to internal diameter of cylindrical chamber | 0.52:1 | | |

Test 2—With 75 mm-long extension tube

| | Overflow | Underflow | Feed |
|---|---|---|---|
| Pulp Weight (g) (solids + $H_2O$) | 9038 | 361 | 9399 |
| Dry Solids | 1491 | 172 | 1663 |
| Pulp % Solids w/w | 16.5 | 47.6 | 17.7 |
| % Weight Split | 89.7 | 10.3 | 100 |
| Volume (cc) | 8091 | 254 | 8345 |
| % Volume Split | 97.0 | 3.0 | 100 |
| % Wt. of particles of size > 53μ | 0.92 | 26.07 | |
| Ratio (R) of length of vortex finder and extension tube to internal diameter of cylindrical chamber | 1.12:1 | | |

Test 3—With 100 mm-long extension tube

| | Overflow | Underflow | Feed |
|---|---|---|---|
| Pulp Weight (g) (solids + $H_2O$) | 9084 | 344 | 9428 |
| Dry Solids | 1508 | 166 | 1674 |
| Pulp % Solids w/w | 16.6 | 48.2 | 17.7 |
| % Weight Split | 90.1 | 9.9 | 100 |
| Volume (cc) | 8191 | 242 | 8433 |
| % Volume Split | 97.1 | 2.9 | 100 |
| % Wt. of particles of size > 53μ | 0.73 | 26.00 | |
| Ratio (R) of length of vortex finder and extension tube to internal diameter of cylindrical chamber | 1.32:1 | | |

Test 4—With 130 mm long extension tube

| | Overflow | Underflow | Feed |
|---|---|---|---|
| Pulp Weight (g) (solids + $H_2O$) | 9202 | 339 | 9541 |
| Dry Solids | 1528 | 162 | 1690 |
| Pulp % Solids w/w | 16.6 | 47.7 | 17.7 |
| % Weight Split | 90.4 | 9.6 | 100 |
| Volume (cc) | 8238 | 239 | 8477 |
| % Volume Split | 97.1 | 2.9 | 100 |
| % Wt. of particles of size > 53μ | 0.71 | 27.67 | |
| Ratio (R) of length of vortex finder and extension tube to internal diameter of cylindrical chamber | 1.56:1 | | |

Test 5—With 213 mm-long extension tube

| | Overflow | Underflow | Feed |
|---|---|---|---|
| Pulp Weight (g) (solids + $H_2O$) | 8125 | 452 | 8577 |
| Dry Solids | 1129 | 203 | 1332 |
| Pulp % Solids w/w | 13.9 | 44.9 | 15.5 |
| % Weight Split | 84.8 | 15.2 | 100 |
| Volume (cc) | 7427 | 327 | 7754 |
| % Volume Split | 95.8 | 4.2 | 100 |
| % Wt. of particles of size > 53μ | 0.49 | 15.47 | |
| Ratio (R) of length of vortex finder and extension tube to internal diameter of cylindrical chamber | 2.22:1 | | |

In the above tests, the actual % by weight of particles larger than 53μ in the overflow from the 125 mm hydrocyclone (Example 2) was larger than for the 44 mm hydrocyclone (Example 1) because of the higher cut point of the larger hydrocyclone. It will be seen that hydrocyclones fitted with the vortex finder extension tubes 9 reduced the overflow content of particles larger than 53μ compared with similar hydrocyclones without the extension tubes.

Indeed, in the tests carried out, the results given, in terms of the removal of larger particles from the overflow, improved steadily with increase in the length of the extension tube, useful improvements being obtained with values of "R" of the order of 2:1, that is, above about 1.5:1, the best results being obtained with values of R of about 2.3:1.

In tests carried out with even longer extension tubes it was found that the extremely strong rotational forces acting on the extension tube caused vibrations which produced disturbances in the flows and/or mechanical failure, or would have caused failure in time, so that accurate results were not obtainable. The indications were, however, that, in more stable apparatus, improved results would be obtained with values of "R" of up to 2.5:1 and perhaps more.

It may be noted that, in the case of the 4th test in Example 1, the % by weight of particles larger than 53μ was reduced to 0.0057% which is slightly better than the separation achieved with a DORR OLIVER Settler (% by weight of particles >53μ=0.006%).

Further tests were carried out with the hydrocyclone used in Example 1, with added body extensions 14. The results in terms of the removal of particles larger than 53μ were not as good as for the hydrocyclone without body extensions but, with the longer vortexfinder extensions (45 mm and 75 mm), were at least better than for the unmodified hydrocyclone. The use of body extensions, in general, gives a better throughput and lower cut point.

It will be appreciated that, although the invention has been described in its application to the separation of kaolin particles, it may equally well be applied to the separation of other materials.

What is claimed is:

1. A hydrocyclone of the type for classifying suspensions of material with substantially the same specific gravity, comprising a body defining within it a separating chamber having a cylindrical portion substantially closed at one end into a coaxial, frusto-conical portion which tapers with a conical taper of about 10 degrees to a first axial outlet, said body further defining a tangential inlet to said cylindrical chamber portion adjacent said end wall and said end wall defining a further axial outlet; a hollow spigot projecting coaxially from said end wall around said further outlet into the separating chamber and having an axial extent slightly greater than that of said inlet, an extension tube projecting coaxially into said separating chamber from the free end of said spigot with a ratio of overall length of said spigot and said extension tube to the diameter of said cylindrical chamber portion being about 2:1.

2. The hydrocyclone of claim 1, wherein said ratio is about 2.3:1.

3. A method of obtaining china clay with a low content of particles having a size greater than 53 microns, including the steps of, classifying a china clay suspension in a series of stages and subjecting the fine suspension from the final stage to further classification in a hydrocyclone of the type for classifying suspensions of material with substantially the same specific gravity, said hydroclone comprising a body defining within it a separating chamber having a cylindrical portion substantially closed at one end by a wall of said body and opening at its opposite end into a coaxial, frusto-conical portion which tapers with a conical taper of about 10 degrees to a first axial outlet, said body further defining a tangential inlet to said cylindrical chamber portion adjacent said end wall and said end wall defining a further axial outlet; a hollow spigot projecting coaxially from said end wall around said further outlet into the separating chamber and having an axial extent slightly greater than that of said inlet, and an extension tube projecting coaxially into said separating chamber from the free end of said spigot with a ratio of the overall length of said spigot and said extension tube to the diameter of said cylindrical chamber portion of the order of 2:1 and the step of recovering the china clay with a low content of particles having a size greater than 53 microns as the overflow through said further outlet.

4. A method as in claim 3, wherein said content of particles having a size greater than 53 microns is less than substantially 0.01% by weight of the weight of the china clay recovered in said overflow.

5. A method as in claim 4, wherein said cylindrical chamber portion of said hydrocyclone has an internal diameter of substantially 44 mm.

* * * * *